United States Patent [19]

Ho

[11] Patent Number: 5,042,188

[45] Date of Patent: Aug. 27, 1991

[54] AUTOMATIC LINE WINDING APPARATUS FOR A FISHING ROD

[76] Inventor: Hsien-Chuan Ho, No. 56, Sec. 2, Taichung-Kang Rd., Taichung, Taiwan

[21] Appl. No.: 454,699

[22] Filed: Dec. 21, 1989

[51] Int. Cl.⁵ ............................................. A01K 89/017
[52] U.S. Cl. ....................................................... 43/21
[58] Field of Search ..................... 43/21, 20; 242/249, 242/250

[56] References Cited

U.S. PATENT DOCUMENTS

| | | | |
|---|---|---|---|
| 902,447 | 10/1908 | Piper | 43/21 |
| 1,005,015 | 10/1911 | French | 43/21 |
| 1,119,474 | 12/1914 | Thomson | 43/21 |
| 2,251,123 | 7/1941 | Fanshier | 43/21 |
| 3,032,290 | 5/1962 | Wallace | 43/21 |
| 3,075,722 | 1/1963 | Stealy | 43/21 |
| 3,411,230 | 11/1968 | Hopper | 43/21 |
| 3,688,456 | 9/1972 | Igwe | 43/21 |
| 4,627,188 | 12/1986 | Razote | 43/21 |
| 4,634,072 | 1/1987 | Stealy | 43/21 |

*Primary Examiner*—Kurt Rowan
*Attorney, Agent, or Firm*—Ladas & Parry

[57] ABSTRACT

An automatic line winding apparatus is mounted on a fishing rod and includes two plates fixed in the handle so as to define an accommodating chamber therebetween, a motor mounted in the accommodating chamber, a battery unit for driving the motor, and a switch starting or stopping the rotation of the motor shaft of the motor. A speed reduction mechanism interconnects the motor shaft and a reel shaft so as to transfer the rotation of the motor shaft to the reel shaft, thereby rotating the reel shaft at a lower speed than that of the motor shaft. A line guide is mounted on the outer surface of the handle and is connected to the motor shaft so as to move radially relative to the handle when the switch is turned on, thereby guiding the fishing line to wind evenly on the reel shaft.

7 Claims, 10 Drawing Sheets

AUTOMATIC LINE WINDING APPARATUS FOR A FISHING ROD

BACKGROUND OF THE INVENTION

This invention relates to a fishing rod, more particularly to an automatic line winding apparatus for a fishing rod which can be operated by a single hand of the user.

Figure 1:
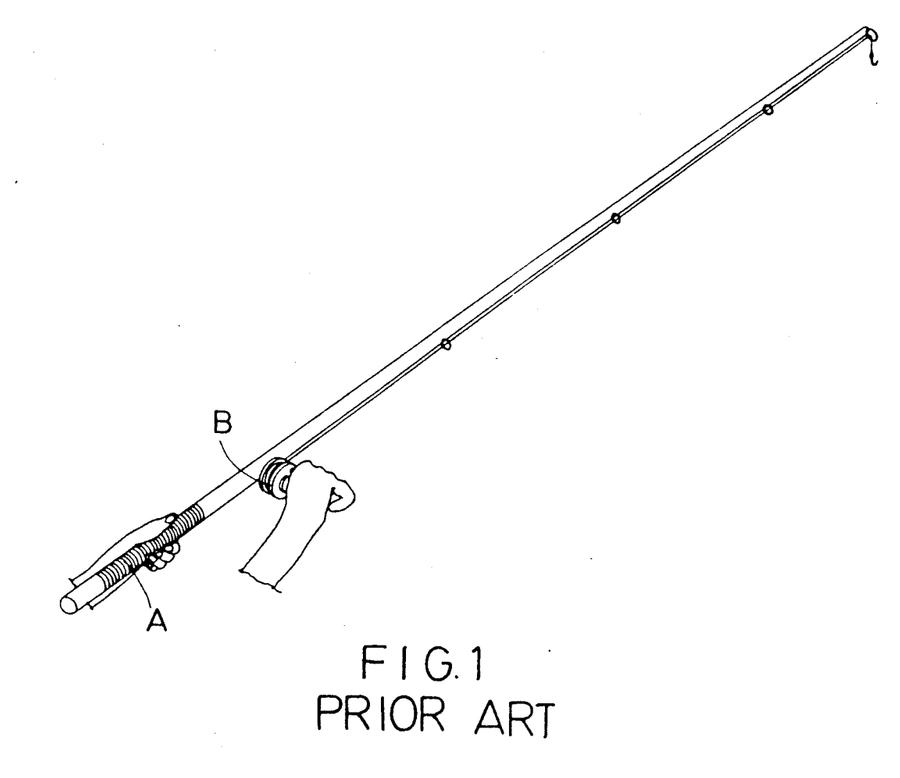
FIG. 1 is a schematic view illustrating how to use the reel of a conventional fishing rod.

Referring to FIG. 1, when rotating the reel (B) of a conventional fishing rod with one hand, it is necessary to hold the fishing rod with the other hand of the user. This simultaneous use of both hands gives the user much inconvenience and fatigue.

SUMMARY OF THE INVENTION

It is the main object of this invention to provide an automatic line winding apparatus for a fishing rod which can be operated by a single hand of the user.

According to this invention, an automatic line winding apparatus is mounted on a fishing rod and includes two plates fixed in the handle of said fishing rod so as to define an accommodating chamber therebetween, a motor mounted in said accommodating chamber, a battery unit for driving said motor, and a switch interposed between said motor and said battery unit so as to start or stop the rotation of the motor shaft of said motor. A speed reduction mechanism interconnects the motor shaft and a reel shaft so as to transfer the rotation of said motor shaft to the reel shaft, thereby rotating said reel shaft at a lower speed than that of said motor shaft. A line guide, mounted on the outer surface of the handle, is connected to the motor shaft so as to move radially relative to said handle when the switch is turned on, thereby guiding the fishing line to wind evenly on a spool.

BRIEF DESCRIPTION OF THE DRAWING

Other features and advantages of this invention will become apparent in the following detailed description of a preferred embodiment of this invention, with reference to the accompanying drawings in which.

DETAILED DESCRIPTION OF THE PREFERRED EMBODIMENT

Figure 2:
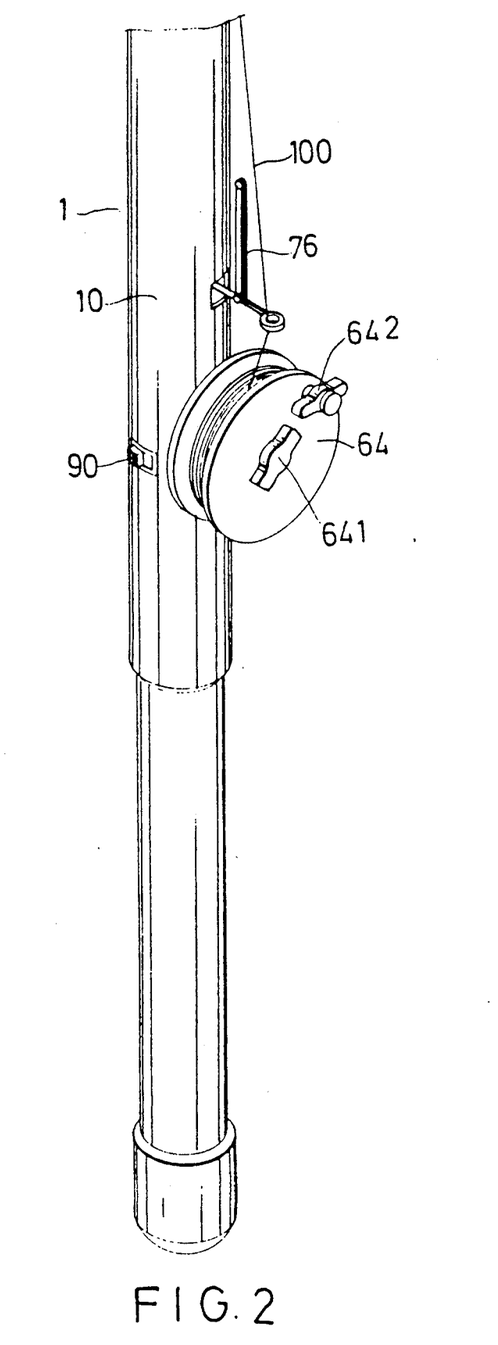
FIG. 2 is a perspective view of an automatic line winding apparatus for a fishing rod according to this invention.
Figure 3:
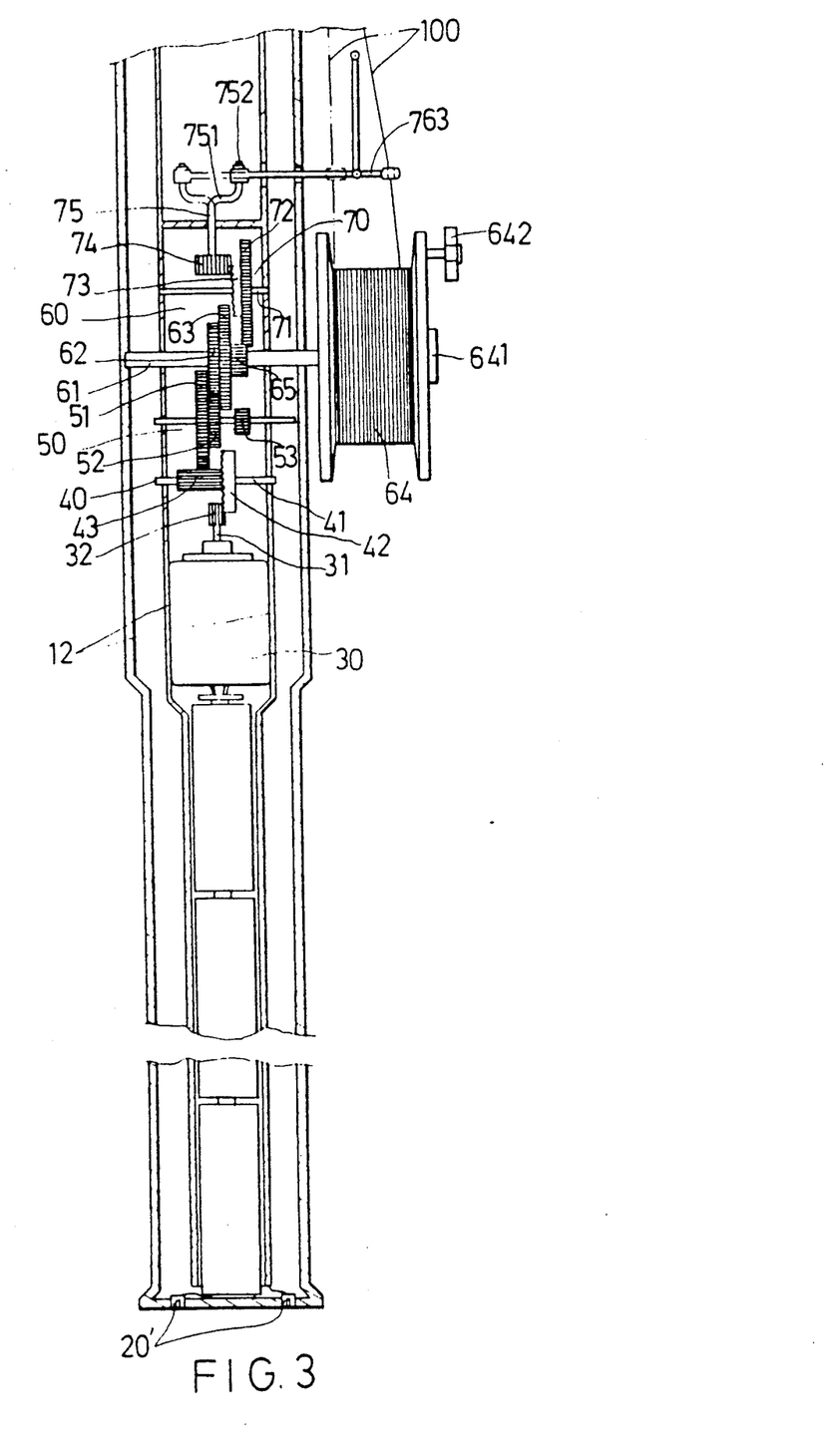
FIG. 3 is a sectional view showing the automatic line winding apparatus of this invention.

Referring to FIGS. 2, 3, an automatic line winding apparatus of this invention is mounted on the hollow handle 10 of a fishing rod and includes a battery unit 20, a motor 30, an intermediate driving unit 40, a movable shaft unit 50, a reel unit 60 and a line guide unit 70.

The handle 10 has an interior space 11 in which a pair of rigid plates 12 are fixed. The plates 12 define an accommodating chamber 13 therebetween.

The battery unit 20 includes several dry batteries accommodated within the battery chamber of the handle 10 so as to supply electric power to the motor 30. A pair of terminals 20' are installed on the bottom end of the handle 10 so as to connect with a storage battery (not shown) if necessary. A switch 90 is mounted on the outer surface of the handle 10 so as to start or stop the rotation of the motor shaft 31 of the motor 3. A spur gear 32 is sleeved rigidly on the motor shaft 31.

The intermediate driving unit 40 includes a driving shaft 41 journalled in the accommodating chamber 13, a face gear 42 sleeved rigidly on the driving shaft 41 so as to engage with the spur gear 32 of the motor shaft 31, and a driving spur gear 43 sleeved rigidly on the driving shaft 41.

Figures 5, 5A:
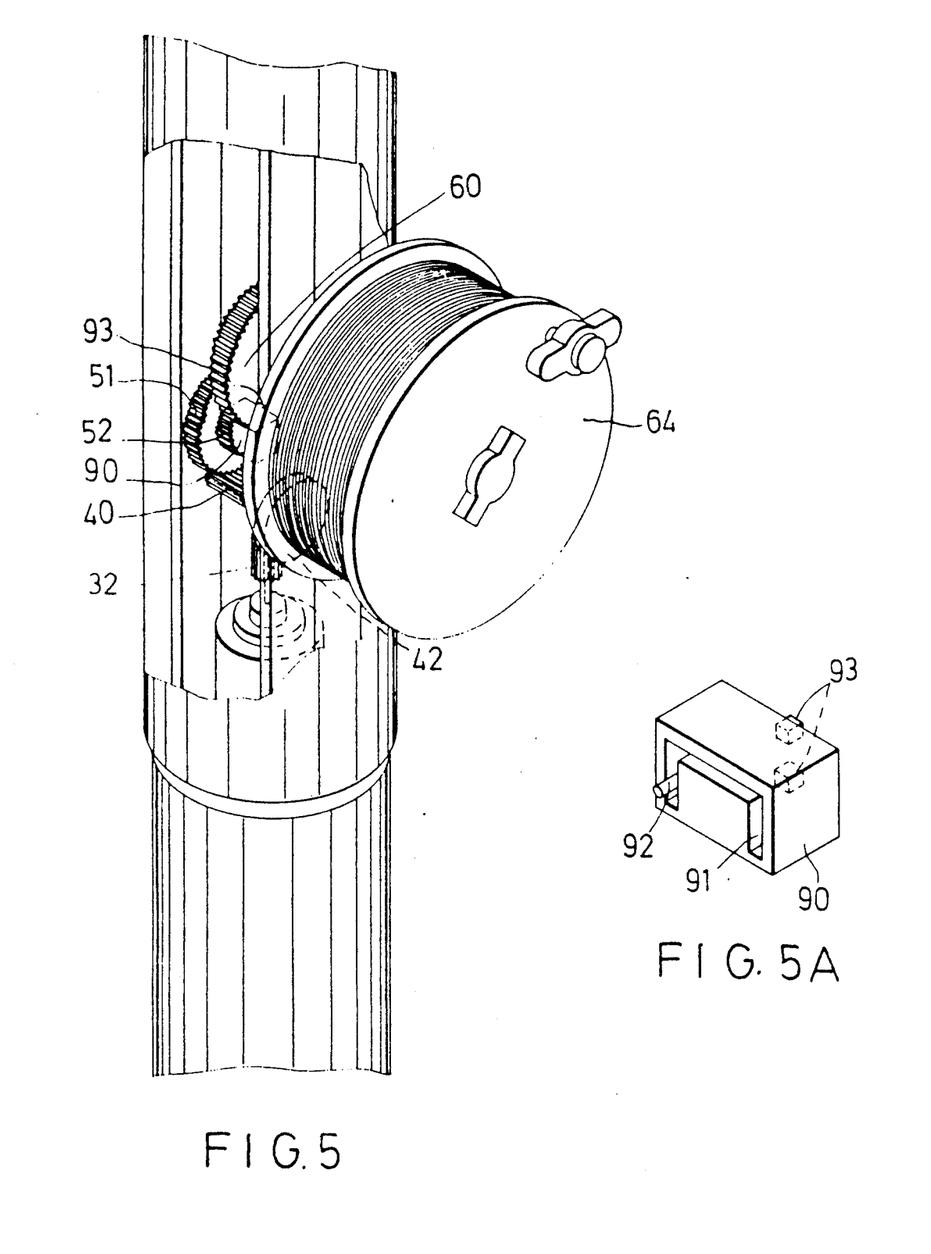
FIG. 5 is a schematic view illustrating the arrangement of the switch of the automatic line winding apparatus according to this invention.

The movable shaft unit 50 includes a movable shaft journalled movably in the accommodating chamber 13, a driven spur gear 51 sleeved rigidly on the movable shaft so as to engage with the driving spur gear 43 of the intermediate driving unit 40, a first-speed gear 52 sleeved rigidly on the movable shaft, and a second-speed gear 53 sleeved rigidly on the movable shaft. As shown in FIGS. 5, 5A, the switch 90 includes an inverted U-shaped slide slot 91 formed therein, an actuator rod 92 movable manually to slide in the slide slot 91, and a pair of push rods 93 connected to the actuator rod 92 so as to impel the movable shaft unit 50.

Figure 13:
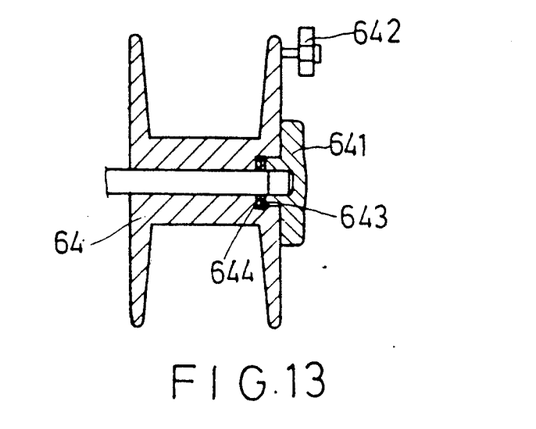
FIG. 13 is a sectional view showing the drag-adjustment knob of the automatic line winding apparatus according to this invention.
Figure 14:
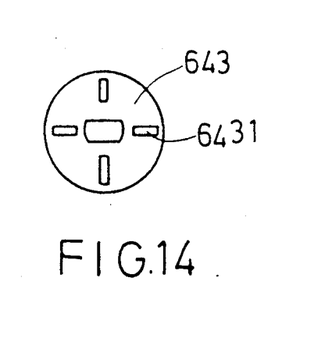
FIG. 14 shows the locking grooves in the drag-adjustment knob of the automatic line winding apparatus according to this invention.
Figure 15:
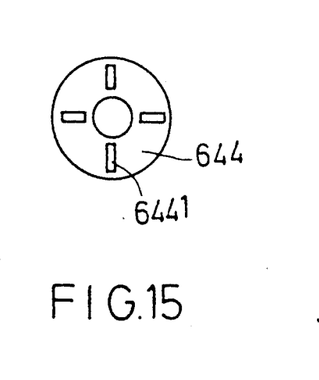
FIG. 15 shows the locking tongues of the spool of the automatic line winding apparatus according to this invention.

The reel unit 60 includes a reel shaft 61 journalled in the accommodating chamber 13, a first-speed gear 62 sleeved rigidly on the reel shaft 61, a second-speed gear 63 sleeved rigidly on the reel shaft 61, a pool 64 sleeved rotatably on the reel shaft 61, and a small spur gear 65 sleeved rigidly on the reel shaft 61. As shown in FIG. 13, the pool 64 includes a drag-adjustment knob 641 actuatable to lock the pool 64 on the reel shaft 61, and a swing lever 642 mounted on the outer wall of the pool 64. The drag-adjustment knob 641 includes a locking groove member 643 secured to the inner surface thereof, which has four locking grooves 6431 (see FIG. 14). The knob 641 can be actuated to engage the locking tongues 6441 of a locking tongue member 644 within the locking grooves 6431 so as to lock the spool 64 on the reel shaft 61. The locking tongue member 644 is secured to the spool 64.

Figure 4:
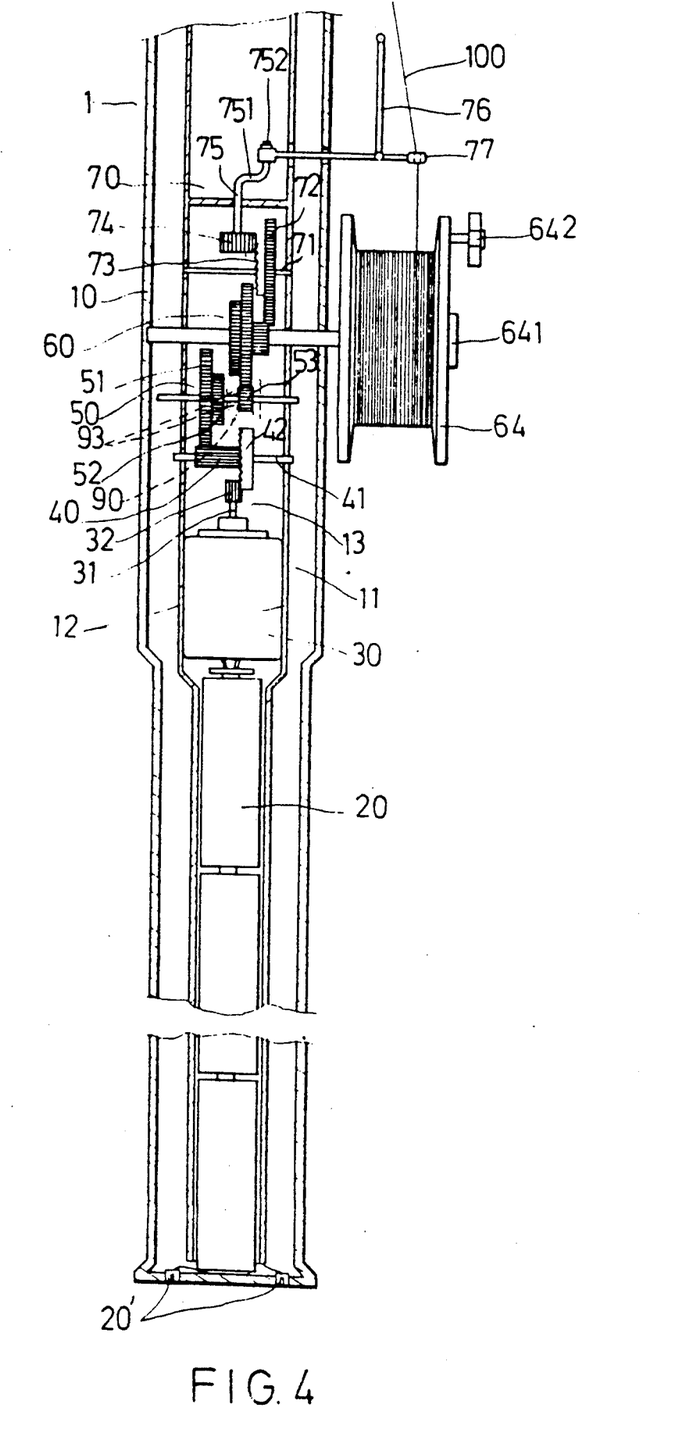
FIG. 4 is a sectional view illustrating the operation of the speed change unit of the automatic line winding apparatus according to this invention.

Again referring to FIGS. 5, 5A, the inverted U-shaped slide slot 91 of the switch 90 has two parallel vertical portions and a horizontal portion interconnecting the vertical portions. The motor is stopped when the actuator rod 92 is positioned in either of the lower ends of the vertical portions of the slot 91. The motor shaft 31 is rotated when the actuator rod 92 is positioned at any position in the horizontal portion of the slot 91. In a case where the motor shaft 31 is rotated, the location of the actuator rod 92 in the upper end of the right vertical portion of the slot 91 moves the movable shaft unit 50 to the position shown in FIG. 3 and interengages the first-speed gears 52, 62 to rotate the reel shaft 61 at a high speed, while the location of the actuator rod 92 in the upper end of the left vertical portion of the slot 91 moves the movable shaft unit 50 to the position shown in FIG. 4 and interengages the second-speed gears 53, 63 to rotate the reel shaft 61 at a low speed. The movable shaft, the first-speed gears 52, 62 and the second-speed gears 53, 63 constitute a speed change unit.

The line guide unit 70 consists of a line guide and a transmission which interconnects the line guide and the reel shaft unit 60, so that the line guide can reciprocate along a straight line. The transmission includes a driven shaft 71 journalled in the accommodating chamber 13, a large spur gear 72 sleeved rigidly on the driven shaft 71 so as to engage with the small spur gear 65 of the reel shaft unit 60, and a face gear 73 sleeved rigidly on the driven shaft 71. The speed change unit 52, 53, 62, 63, the small spur gear 65, and the large spur gear 72 constitute a speed reduction mechanism. An axially extending crankshaft 75 is journalled in the accommodating chamber 13 and carries a driven spur gear 74 sleeved rigidly on the crankshaft 75 so as to engage with the face gear 73. The crankshaft 75 has a crank 751 and a crank pin 752 which is connected rotatably to the line guide.

Figure 6:
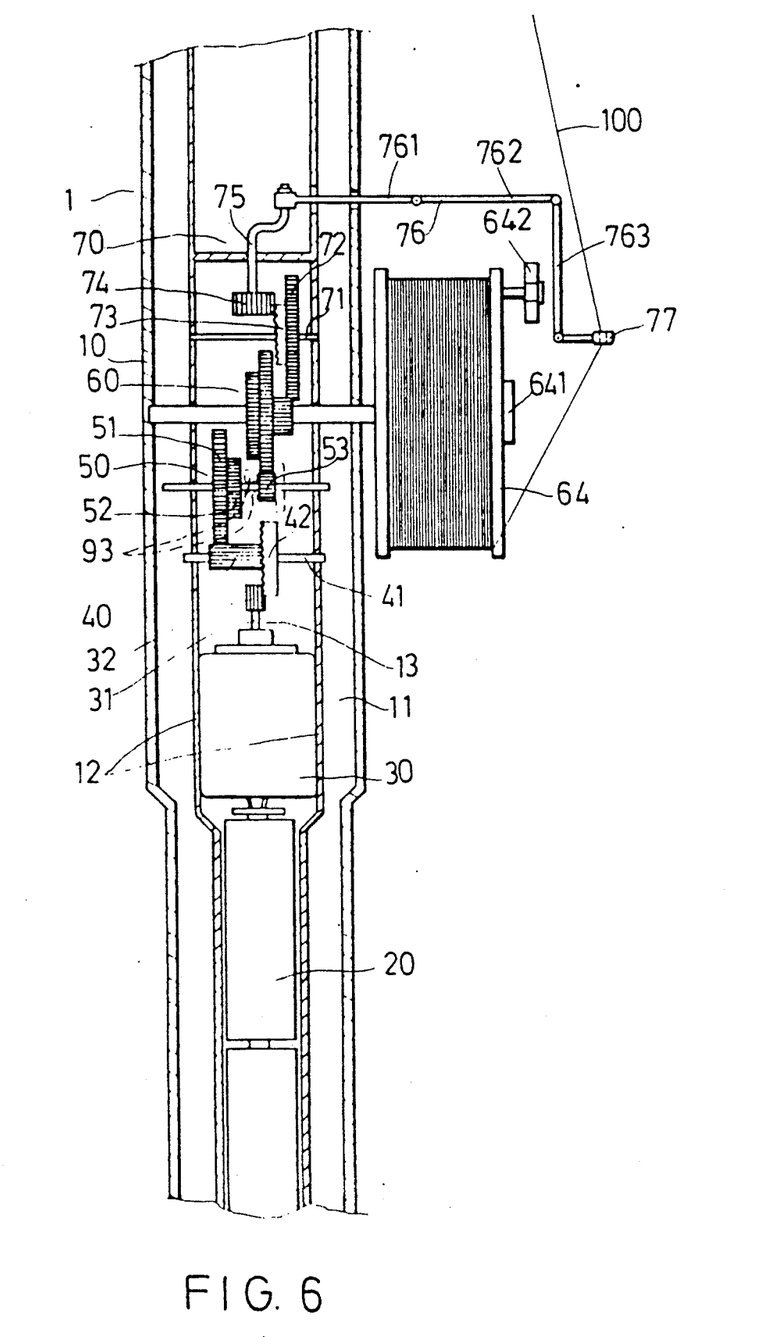
FIG. 6 is a sectional view illustrating the unfolded position of the line guide of the automatic line winding apparatus according to this invention.

Referring to FIG. 6, the line guide has a foldable sliding rod 76 connected to the crank pin 752, and a guide ring 77 carried on the sliding rod 76. The sliding rod 76 is radially and slidably mounted on the handle 10 and has a straight inner section 761 extending into the accommodating chamber 13, a straight intermediate section 762 connected pivotally to the outer end of the inner section 761 at the inner end thereof, and a generally L-shaped section 763 carrying the guide ring 77 thereon. As illustrated, the generally L-shaped section 763 has a long portion connected pivotally to the outer end of the intermediate section 762 at the upper end thereof, and a short portion integrally formed with the lower end of the long portion. The guide ring 77 is secured to the right end of the short portion of the generally L-shaped section 763.

When it is desired to wind a fishing line 100 on the spool 64, the sliding rod 76 is folded into the position shown in FIG. 3 in such a manner that the intermediate section 762 is turned upward to a vertical position and the long portion of the generally L-shaped section 763 is rotated to overlap the intermediate section 762, so as to locate the guide ring 77 between the tip of the fishing rod and the spool 64. The fishing line 100 can then be fully wound on the spool 64.

When it is desired to unwind the fishing line 100 from the spool 64, the sliding rod 76 is unfolded to the position shown in FIG. 6, in which both the intermediate section 762 and the short portion of the generally L-shaped section 763 are horizontal and the long portion of the generally L-shaped section 763 is vertical. In this case, the reel shaft 61 is aligned with the short portion of the generally L-shaped section 763 of the sliding rod 76. In this way, the fishing line 100 can be fully unwound from the spool 64.

Figure 7:
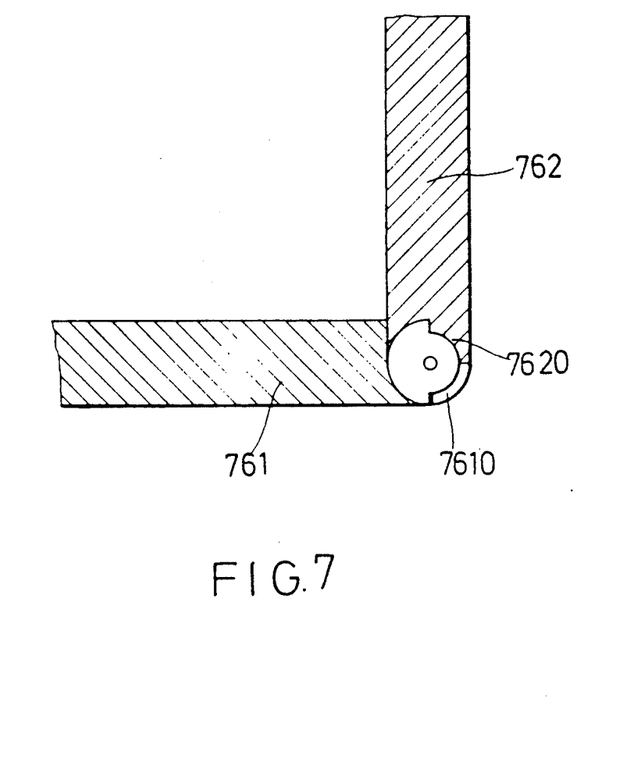
FIG. 7 is a schematic view illustrating how to keep the line guide of the automatic line winding apparatus at a folded position in accordance with this invention.
Figure 8:
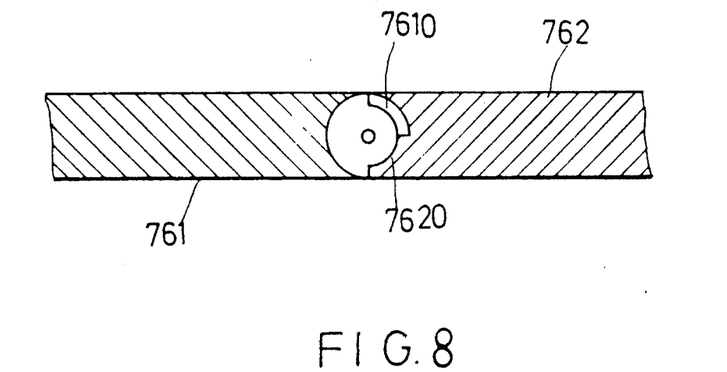
FIG. 8 is a schematic view illustrating how to keep the line guide of the automatic line winding apparatus at an unfolded position in accordance with this invention.
Figure 9:
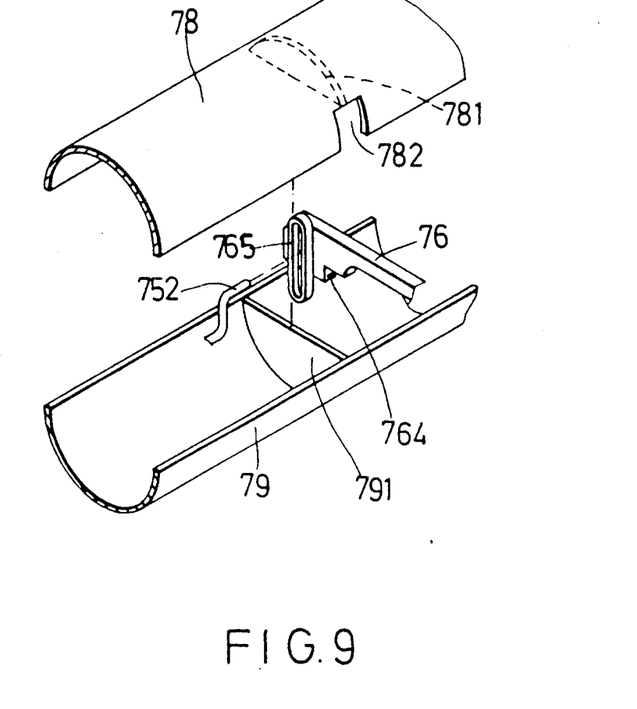
FIG. 9 is a schematic view illustrating the arrangement of the guide mechanism of the automatic line winding apparatus according to this invention, which is used to guide the line guide to move in a rectilinear motion.
Figure 10:
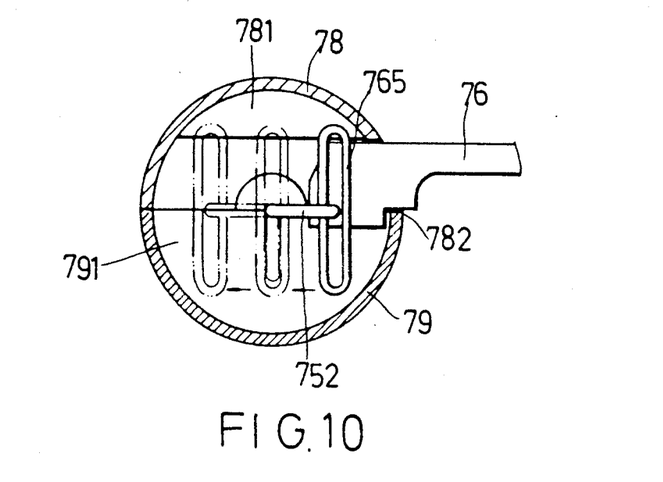
FIG. 10 is a schematic view illustrating the rectilinear reciprocal movement of the line guide of the automatic line winding apparatus according to this invention.
Figure 11:
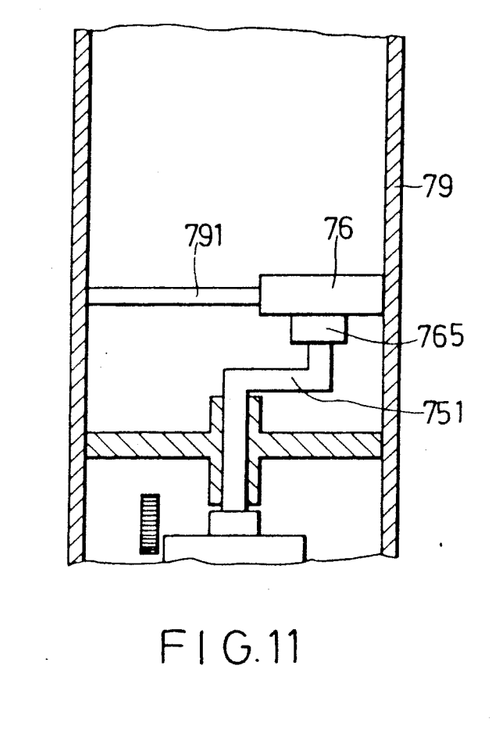
FIGS. 11, 12 are side views illustrating the guide mechanism of the automatic line winding apparatus according to this invention.
Figure 12:
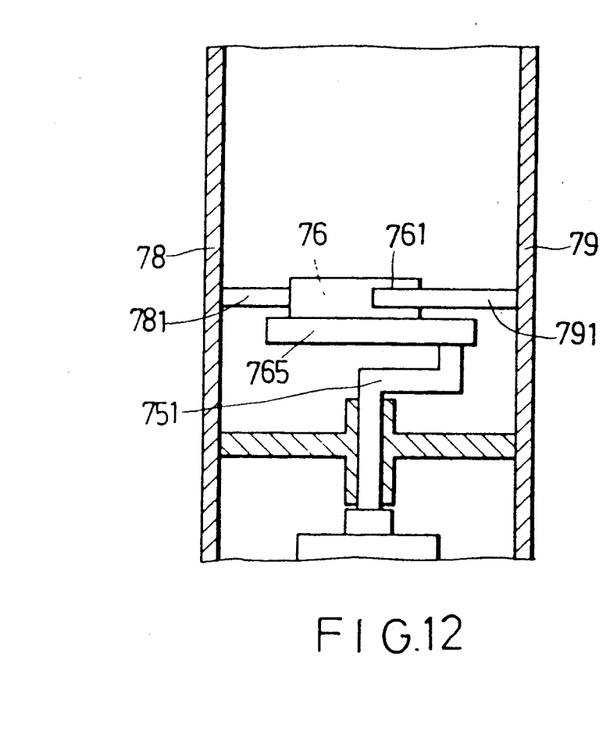

Referring to FIGS. 7, 8, to keep the sliding rod 76 in the folded and unfolded positions, the inner section 761 has a C-shaped slot 7610, and the intermediate section 762 includes an integral positioning block 7620 disposed slidably in the C-shaped slot 7610. The block 7620 can be positioned in the upper end of the C-shaped slot 7610 to put the sliding rod 76 at the folded position, or in the lower end of the C-shaped slot 7610 to put the sliding rod 76 at the unfolded position. The generally L-shaped section 763 is positioned relative to the intermediate section 762 in the same manner in which the intermediate section 762 is positioned relative to the inner section 761.

Referring to FIGS. 9-12, a guide mechanism 765 is interposed between the crank pin 752 and the sliding rod 76 so as to convert the rotation of the crank pin 752 into the rectilinear reciprocal motion of the sliding rod 76. As illustrated, the handle 10 is in the form of a hollow cylinder and consists of a semicircular upper half 78 with an upper clamping plate 781 secured therein, and a lower semicircular lower half 79 with a lower clamping plate 791 secured therein. The upper and lower clamping plates 781, 791 have spaced, straight, horizontal sides between which a guideway is defined for the inner section 761 of the sliding rod 76. The sliding rod 76 extends through the notch 782 in the upper half 78. The upper half 78 is adhered to the lower half 79.

The inner section 761 of the sliding rod 76 has an open-ended, horizontal, straight slot 764 formed in the lower surface thereof, in which the straight side of the lower clamping plate 791 is engaged, and a fixed guide mechanism 765 with a vertically extending guide slot. The crank pin 752 is received slidably in the guide slot and has a diameter slightly less than the width of the guide slot so as to effect a rectilinear reciprocal movement in the guide slot.

With this invention thus explained, it is apparent that numerous modifications and variations can be made without departing from the scope and spirit of this invention. It is therefore intended that this invention be limited only as indicated in the appended claims.

I claim:

1. An automatic line winding apparatus for a fishing rod, said fishing rod having a tip disposed at a front end thereof, and a hollow handle disposed at a rear end of said fishing rod, said winding apparatus comprising:

two plates fixed in said handle so as to define an accommodating chamber therebetween;
a motor, mounted in said accommodating chamber, having a motor shaft;
a battery unit for driving said motor;
a switch interposed between said motor and said battery unit so as to start or stop rotation of said motor shaft;
a reel shaft journalled in said accommodating chamber so as to wind a fishing line thereon;
a speed reduction mechanism interconnecting said motor shaft and said reel shaft so as to transfer rotation of said motor shaft to said reel shaft, thereby rotating said reel shaft at a lower speed than that of said motor shaft; and a line guide, mounted on an outer surface of said handle, connected to said motor shaft so as to move radially relative to said handle when said switch is turned on, thereby guiding said fishing line to wind evenly on said reel shaft.

2. An automatic line winding apparatus as claimed in claim 1, wherein said speed reduction mechanism includes a speed change unit which can be operated selectively to rotate said reel shaft at a first speed or a second speed.

3. An automatic line winding apparatus as claimed in claim 2, wherein said speed change unit includes a movable shaft journalled movably in said accommodating chamber, two first-speed gears respectively and rigidly sleeved on said movable shaft and said reel shaft, and two second-speed gears respectively and rigidly sleeved on said movable shaft and said reel shaft, whereby said movable shaft can be moved to interengage said first-speed gears so as to rotate said reel shaft at said first speed, or to interengage said second-speed gears so as to rotate said reel shaft at said second speed.

4. An automatic line winding apparatus as claimed in claim 3, wherein said switch includes an inverted, generally U-shaped slide slot formed therein, and an actuator rod disposed slidably in said slide slot, said slide slots having two parallel vertical portions and a horizontal portion interconnecting upper ends of said vertical portions, position of said actuator rod in either of lower ends of said vertical portions of said slide slot stopping said motor shaft, position of said actuator rod in an upper end of one of said vertical portions of said slide slot driving said motor and moving said movable shaft to interengage said first-speed gears so as to rotate said reel shaft at said first speed, position of said actuator rod in an upper end of another of said vertical portions of said slide slot driving said motor and moving said movable shaft to interengage said second-speed gear so as to rotate said reel shaft at said second speed.

5. An automatic line winding apparatus as claimed in claim 1, wherein said line guide includes a sliding rod which is radially and slidably mounted on said handle and which can effect a rectilinear reciprocal movement, said sliding rod having a straight inner section extending into said accommodating chamber, a straight intermediate section connected pivotally to an outer end of said inner section at an end thereof, a generally L-shaped section having a long portion connected pivotally to the other end of said intermediate section at one end thereof and a short portion integrally formed with the other end of said long portion, and a guide ring secured to said short portion of said generally L-shaped section, whereby, when it is desired to wind said fishing line on said reel shaft, said sliding rod can be folded in such a manner that said intermediate section is turned upward to a vertical position and said long portion of said generally L-shaped section is rotated to overlap said intermediate section so as to locate said guide ring between said tip of said fishing rod and said reel shaft; and when it is desired to unwind said fishing line from said reel shaft, said sliding rod can be unfolded so that both said intermediate section and said short portion of said generally L-shaped section are generally perpendicular to said handle and said long portion of said generally L-shaped section is generally parallel to said handle, thereby aligning said reel shaft with said short portion of said generally L-shaped section of said sliding rod.

6. An automatic line winding apparatus as claimed in claim 5, wherein a transmission interconnects said sliding rod of said line guide and said reel shaft, said transmission including a driven shaft journalled in said accommodating chamber, two interengaged spur gears which are respectively sleeved rigidly on said reel shaft and said driven shaft, a face gear sleeved rigidly on said driven shaft, an axially extending crankshaft journalled in said accommodating space, a driven spur gear sleeved rigidly on said crankshaft so as to engage with said face gear, a crank connected securely to said crankshaft, a crank pin mounted on said crank to connect rotatably to an inner end of said inner section of said sliding rod of said line guide, and a guide mechanism for guiding said sliding rod of said line guide to move in a rectilinear reciprocal motion.

7. An automatic line winding apparatus as claimed in claim 6, wherein said handle is in the form of a hollow cylinder which consists of two semicircular halves, said guide mechanism including a generally semicircular first clamping plate secured in one of said halves of said handle and having a straight side perpendicular to axis of said handle, an open-ended straight slot formed along length of said inner section of said sliding rod in such a manner that said straight side of said first clamping plate is engaged slidably within said open-ended straight slot, a generally semicircular second clamping plate secured in another of said halves of said handle and having a straight side which is aligned with said straight side of said first clamping plate, which confines said inner section of said sliding rod between said first and second clamping plates, and a straight guide slot formed in said inner section of said sliding rod and extending in a direction perpendicular to said straight sides of said first and second clamping plates, so that an end of said crank pin is received slidably in said guide slot, whereby, when said crankshaft is rotated, said inner section of said sliding rod can reciprocate along said straight sides of said first and second clamping plates.

* * * * *